MAGNETIC RECORDING MACHINE WITH A FIGURE 8 PATH FOR FLEXIBLE RECORD SHEET

Filed July 26, 1962

INVENTORS
GIUSEPPE CALANO
MANRICO COMPARE
BY
Kenyon & Kenyon
ATTORNEYS

United States Patent Office 3,114,150

Patented Dec. 10, 1963

3,114,150

MAGNETIC RECORDING MACHINE WITH A FIGURE 8 PATH FOR FLEXIBLE RECORD SHEET

Giuseppe Calano, Mercenasco, Turin, and Manrico Compare, Ivrea, Turin, Italy, assignors to Ing. C. Olivetti & C. S.p.A., Ivrea, Italy, a corporation of Italy Filed July 26, 1962, Ser. No. 212,540
Claims priority, application July 31, 1961
7 Claims. (Cl. 346—74)

This invention relates to recording machines wherein a flexible record sheet having two opposite recording faces is moved past a single magnetic head adapted to be advanced parallel to the leading edge of said sheet to scan successive tracks of each face, said faces being alternately exposed to said head.

In a known recording machine of this type the flexible record sheet is wrapped about a rotatable drum which is first rotated in one direction for causing the magnetic head to fully scan the tracks of one face thereof, said rotation being then reversed for automatically turning the record sheet upside down and for causing the magnetic head to fully scan the tracks of the other face thereof. However, the machine requires a full revolution of the drum to turn the record sheet, during which the scanning is discontinued. Therefore, this machine is unsuitable where a single recording, such as a dictated letter or a piece of music, takes the full length of the two faces of the record sheet.

It is the primary object of the invention to provide an improved recording machine obviating the above disadvantage.

Another object is to provide a recording machine adapted to continuously scan the two faces of the sheet irrespective of the passage from one face to the other.

A further object is to provide a recording machine which is inexpensive to manufacture and simple and reliable to operate.

According to the invention, in a recording machine of the above type, we now provide a structure for guiding said sheet along an endless substantially 8-shaped path, said structure comprising a pair of loops wherein said sheet may travel in one sense and a central portion wherein said sheet may travel in either sense, said loops having an equal length, said sheet being at least half as long as said path, and means for mounting said head in correspondence with said central portion, whereby said sheet will alternately expose either face to said head and the scanning of one track of one face is followed without discontinuity by the scanning of a corresponding track of the other face.

Further objects, features and advantages of the invention will become apparent from the following description of preferred embodiment thereof and from the accompanying drawings, wherein.

Figure 2:
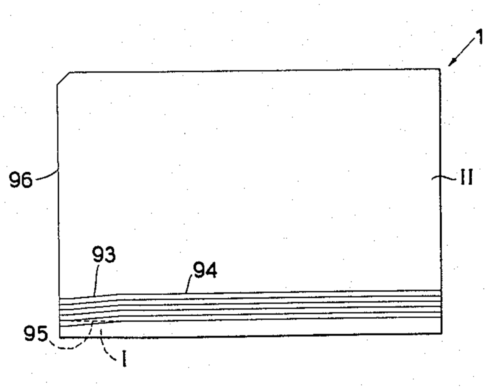
FIG. 2 shows a record sheet for the machine of FIG. 1.

With reference to FIG. 2, the numeral 1 indicates a record member in form of a flexible sheet or card of suitable bristol board or the like, which by its inherent resilience is normally urged to keep flat. The record sheet is covered by a magnetizable recording film upon each one of its two opposite faces I and II, whereby the record sheet has two opposite recording faces. The record sheet may be scanned on the face I along successive tracks 95 and on the face II along successive tracks 94, said tracks being substantially perpendicular to the leading edge 96 thereof.

The recording machine comprises a structure for guiding the record sheet along an endless, substantially 8-shaped path formed of a pair of loops and of a central portion. To this end said srtucture comprises a pair of cylindrical guiding members 5 and 16 (FIG. 1) wherein the sheet 1 will travel in one sense, and a central guiding element 8, 10 located between the members 5 and 16 wherein the sheet 1 will alternately travel in either sense. The guiding members 5 and 16 have equal lengths in the direction of the sheet path, the sheet 1 being at least half as long as the 8-shaped path. Furthermore, the guiding members 5 and 16 are symmetrically located with respect to an intermediate plane 100 crossing the guiding element 8, 10.

The guiding members 5 and 16 are each one formed of an internal cylindrical body 5′ and 16′, respectively, surrounded by a U-shaped body 3 and 15 flanked by a pair of plates 4 and 4′, respectively, whereas the guiding element 8, 10 is formed of a lower plate 8 and an upper plate 10. The upper opening left between the right hand end of the body 3 and the body 5′, as well as the upper opening left between the left hand end of the body 15 and the body 16′ will be entered by the record sheet and will be defined as the injecting end, whereas the lower opening left between the right hand end of the body 3 and the body 5′, as well as the lower opening left between the left hand end of the body 15 on the body 16′ will be left by the record sheet and will be defined as the ejecting end. It will be clear from FIG. 1 that the injecting end and the ejecting end of the guiding member 5 are facing the injecting end and the ejecting end, respectively, of the guiding member 16.

Two pivoted transverse bails 9 and 18 associated with the guiding members 5 and 16, respectively, are each one located between the guiding element 8, 10 and the associated guiding member and are normally urged either by their own weight or by spring action to contact a corresponding inclined portion 8′ and 8″, respectively, of the lower plate 8. Each bail 9, 18 is adapted to cause the leading edge 96 of the record sheet 1, when leaving the ejecting end of the associated guiding member 5 and 16, respectively, to enter the guiding element 8, 10 and, when leaving same, to enter the injecting end of the associated guiding member.

Furthermore, the machine comprises a pair of feeding devices for the record sheet, each device being located between the guiding element 8, 10 and each one of the guiding members 5 and 16, and being formed of a feeding roller 6 and 14, respectively, cooperating with two opposite pressing rollers 7, 19 and 13, 17, respectively, for urging the sheet 1 toward and from the guiding element 8, 10. More particularly, the feeding rollers 6 and 14 are continuously motor driven at an equal speed in the senses indicated by the corresponding arrows, by known means not shown in the drawings. The pressing rollers 7, 19 and 13, 17 are yieldably urged toward the cooperating feeding rollers 6 and 14, respectively, in a manner known per se.

The recording machine is provided with a single magnetic recording and/or reading head 12 secured to a support 123 slidably and rockably mounted on a transverse shaft 122. Under the urge of a spring 124 the head 12 enters a transverse slot 11 provided in the plate 10, whereby the magnetic head 12 is slidably mounted in correspondence with the crossing line of the plane 100 and the guiding element 8, 10. The support 123 is hand operable through a knob 120 to lift the head 12 from the slot 11 and is provided with a projection 20 normally engaging a transverse worm 21 adapted to be intermittently rotated to advance the support 123 and the head 12 parallel to the leading edge 96 of the sheet 1 from track to track.

More particularly, the worm 21 is secured to a cam disk 25 frictionally urged through a friction joint 28 to be rotated counterclockwise by a continuously rotating toothed wheel 26 which engages a similar toothed wheel 27 secured to the feeding roller 14. The disk 25 is normally locked by a bent lug 22 of an arm of a bail 30 pivoted at 23. Pivoted on another arm of the bail 30 is a hook 24 spring urged to enter a hole 24' of the plate 8 in order to be engageable by the leading edge 96 of the sheet 1.

Finally, the guiding member 5 is provided on its left hand end with an aperture housing a shaft 51. The shaft 51 thus provides on the guiding member 5 a first slot 2 through which the sheet 1 may be inserted into the machine and a second slot 29 through which the sheet 1 may be removed from the machine. Pivoted on the shaft 51 is a member or bail 49 manually or automatically rockable for alternately opening and closing the first slot 2 and the second slot 29 by means of its two arms 50.

It has been remarked that the sheet 1 should be at least as long as the 8-shaped path. Indeed if the sheet 1 were shorter, the recording would be discontinued when passing from one face to the other face of the sheet. On the contrary, a small excess of length of the sheet would not affect the length and the continuity of the scanning but only cause the exceeding portion of the sheet to remain unscanned.

The recording machine operates as follows.

Figure 1:
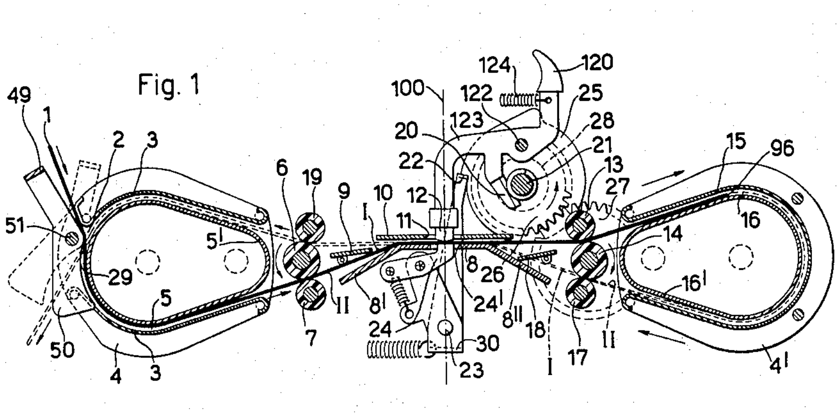
FIG. 1 shows a right-hand longitudinal partial sectional view of a recording machine according to the invention.

Before inserting the sheet 1 into the machine the bail 49 will be located in the position shown in FIG. 1 wherein the slot 2 is open and the slot 29 is closed by the arms 50, whereas by means of the knob 120 the support 123 must be transversely shifted to be located at the beginning of its stroke. The leading edge 96 of the sheet 1 having its face I directed upwards is now inserted through the slot 2 into the guiding member 5 and the sheet is manually pushed until being grasped by the rollers 6 and 7 which will urge the sheet 1 toward the guiding element 8, 10. The sheet 1 first encounters the inclined portion 8' of the plate 8 and then the bail 9 which is slightly raised to enable the sheet to enter the guiding element 8, 10. The leading edge 96 of the sheet 1 now engages the hook 24 which is slightly rocked clockwise without affecting the bail 30. Thereupon the face I of the sheet 1 passes under the magnetic head 12 which thus scans the first track 95 of the face I thereof.

When the leading edge 96 leaves the guiding element 8, 10 the sheet 1 tends to keep flat and to direct the leading edge 96 straight ahead toward the rollers 13 and 14. However, if the sheet bows down, the leading edge 96 first follows the inclined portion 8'' of the plate 8 and is then deviated by the bail 18 toward the rollers 13 and 14. These rollers thus urge the sheet 1 into the guiding member 16 through the injecting end thereof.

Upon being wound on the guiding member 16, the sheet 1 is turned upside down to direct its face II upwards and its leading edge 96 is directed by the ejecting end of the member 16 toward the rollers 14, 17 according to the dotted path shown in FIG. 1. Then the sheet 1 passes between the inclined portion 8'' of the plate 8 and the bail 18 which is slightly raised to enable the sheet to enter the guiding element 8, 10 and to pass under the magnetic head 12, which thus scans the first track 94 of the face II corresponding to the first track 95 of the face I. Assuming the sheet 1 is exactly as long as half the length of the 8-shaped path, it will be realized that when the leading edge arrives under the magnetic head 12 the trailing edge of the sheet just leaves same.

Simultaneously the leading edge 96 engages the hook 24, which is now shifted leftwards, thus rocking the bail 30 counterclockwise. The lug 22 of the bail 30 thus releases the cam disk 25 which is rotated counterclockwise together with the worm 21 by the wheel 26 through the friction joint 28. The leading edge 96 of the sheet 1 then slips over the hook 24, and the lug 22 of the bail 30 thus arrests the disk 25 after one revolution. The worm 21 during its revolution transversely advances the magnetic head 12 one step according to one magnetic track. Due to the simultaneous movement of the sheet 1 and the head 12 during said revolution an initial portion 93, FIG. 2, of each track 94 of the face II will be inclined.

The leading edge 96 of the sheet 1 when leaving the guiding element 8, 10 will be directed toward the rollers 6 and 19, eventually by cooperation of the bail 9 in the same way as it was directed toward the rollers 13, 14 by cooperation of the bail 18. The rollers 6, 19 now urge the sheet 1 into the guiding member 5 through the injecting end thereof. The sheet 1 is thus wound about the member 5 according to the dotted path shown in FIG. 1, thereby completing its travel along the full 8-shaped path. Thereupon the sheet is caused by the arms 50 to resume its travel to cause the magnetic head 12 to sequentially scan the second track 95 of the face I and the second track 94 of the face II, and so on for the subsequent tracks.

It will thus be clear that the operation of the recording machine is continuous and that the 8-shaped path enables the sheet 1 to alternately expose its two faces to the magnetic head 12, whereby the scanning of one track of one face is followed without discontinuity by the scanning of a corresponding track of the other face.

When the sheet 1 has been fully scanned, it may be removed from the machine by rocking the bail 49 to the position shown by broken lines in FIG. 1. The two arms 50 of the bail 49 will now close the slot 2 and open the slot 29. When the leading edge 96 reaches the slot 29 it crosses same and the sheet follows a paths tangent to the cyinder 5' as shown by broken lines in FIG. 1, whereby it may be speedily removed from the machine.

It is intended that modifications, improvements and additions of parts may be made to the above described recording machine without departing from the scope of the invention. For example, the 8-shaped path could be formed of two loops not necessarily symmetrical with respect to the plane 100 or of two loops of mutually different shape, provided these loops have equal length. Moreover the central guiding element could be curved instead of being flat. Furthermore, the magnetic head 12 could be advanced continuously, instead of step by step, for example by rotating the worm 21 at a suitable uniform speed to cause the head 12 to scan rectilinear tracks on both the faces of the sheet. Finally, upon completion of the scanning of the sheet 1 the bail 49 could be automatically rocked under the control of the magnetic head 12 when advanced through its last step, whereas the head 12 could be automatically restored transversely when the sheet 1 has been removed from the machine.

What we claim is:

1. In a recording machine wherein a flexible record sheet having two opposite recording faces is moved past a single magnetic head adapted to be advanced parallel to the leading edge of said sheet to scan successive tracks of each face, said faces being alternately exposed to said head, the combination of:

(*a*) a structure for guiding said sheet along an endless substantially 8-shaped path, said structure comprising a pair of loops wherein said sheet may travel in one sense and a central portion wherein said sheet may travel in either sense, said loops having an equal length, said sehet being at least half as long as said path, (*b*) and means for mounting said head in correspondence with said central portion, whereby said sheet will alternately expose either face to said head and the scanning of one track of one face is followed without discontinuity by the scanning of a corresponding track of the other face.

2. In a recording machine wherein a flexible record sheet having two opposite recording faces is moved past a single magnetic head adapted to be advanced parallel to the leading edge of said sheet to scan successive tracks of each face, said faces being alternately exposed to said head, the combination of:

(a) structure for guiding said sheet along a substantially 8-shaped path, said structure being formed of a pair of cylindrical guiding members wherein said sheet will travel in one sense and a guiding element located between said members wherein said sheet will travel in either sense, said members being opposite with respect to an intermediate plane crossing said element and having a mutual equal length, the length of said sheet being at least half the length of said path, (b) and means for mounting said head in the crossing line of said plane and said element, whereby said sheet will alternately expose either face to said head and the scanning of one track of one face is followed without discontinuity by the scanning of a corresponding track of the other face.

3. In a recording machine wherein a flexible record sheet having two opposite recording faces is moved past a single magnetic head adapted to be advanced parallel to the leading edge of said sheet to scan successive tracks of each face, said faces being alternately exposed to said head, the combination of:

(a) a pair of cylindrical guiding members for said sheet, each one having an injecting end and an ejecting end facing the injecting end and the ejecting end, respectively, of the other member, said members being symmetrical with respect to an intermediate plane, (b) a guiding element located between said members and crossing said plane, said element being adapted to guide said sheet in either sense of travel.

(c) a pair of pivoted transverse bails associated with said pair of members and each one adapted to cause said edge when leaving the ejecting end of the associated member to enter said guiding element and when leaving said guiding element to enter the injecting end thereof, whereby said sheet will be moved along a substantially 8-shaped path, (d) and means for mounting said head in the crossing line of said plane and said element, whereby said sheet will alternately expose either face to said head and the scanning of one track of one face is followed without discontinuity by the scanning of a corresponding track of the other face.

4. In a recording machine wherein a flexible record sheet having two opposite recording faces is moved past a single magnetic head adapted to be advanced parallel to the leading edge of said sheet to scan successive tracks of each face, said faces being alternately exposed to said head, the combination of:

(a) a pair of cylindrical guiding members for said sheet, each one having an injecting end and an ejecting end facing the injecting end and the ejecting end, respectively, of the other member, said members being symmetrical with respect to an intermediate plane.

(b) a guiding element located between said members and crossing said plane, said element being adapted to guide said sheet in either sense of travel, (c) a pair of feeding devices for said sheet, each device being located between one of said members and said element and being formed of a feeding roller cooperating with two opposite pressing rollers for urging said sheet toward and from said element, respectively, whereby said sheet will be moved along a substantially 8-shaped path, (d) and means for mounting said head in the crossing line of said plane and said element, whereby said sheet will alternately expose either face to said head and the scanning of one track of one face is followed without discontinuity by the scanning of a corresponding track of the other face.

5. In a recording machine wherein a flexible record sheet having two opposite recording faces is moved past a single magnetic head adapted to be advanced parallel to the leading edge of said sheet to scan successive tracks of each face, said faces being alternately exposed to said head, the combination of:

(a) a pair of cylindrical guiding members for said sheet, each one having an injecting end and an ejecting end facing the injecting end and the ejecting end, respectively, of the other member, said members being symmetrical with respect to an intermediate plane, (b) a guiding element located between said members and crossing said plane, said element being adapted to guide said sheet in either sense of travel, (c) a pair of feeding devices for said sheet, each device being located between one of said members and said element and being formed of a feeding roller cooperating with two opposite pressing rollers for urging said sheet toward and from said element, respectively, whereby said sheet will be moved along a substantially 8-shaped path, (d) a pair of pivoted transverse bails associated with said pair of members and each one adapted to cause said edge when leaving the ejecting end of the associated member to enter said guiding element and when leaving said guiding element to enter the injecting end thereof, (e) and means for mounting said head in the crossing line of said plane and said element, whereby said sheet will alternately expose either face to said head and the scanning of one track of one face is followed without discontinuity by the scanning of a corresponding track of the other face.

6. In a recording machine wherein a flexible record sheet having two opposite recording faces is moved past a single magnetic head adapted to be advanced parallel to the leading edge of said sheet to scan successive tracks of each face, said faces being alternately exposed to said head, the combination of:

(a) a structure for guiding said sheet along a substantially 8-shaped path, said structure being formed of a pair of cylindrical guiding member wherein said sheet will travel in one sense and a guiding element located between said member wherein said sheet will travel in either sense, said members being symmetrical with respect to an intermediate plane crossing said element, the length of said sheet being at least half the length of said path, (b) means for mounting said head in the crossing line of said plane and said element, whereby said sheet will alternately expose either face to said head and the scanning of one track of one face is followed without discontinuity by the scanning of a corresponding track of the other face, (c) a first slot on one of said members through which said sheet may be inserted in the machine, (d) a second slot on said one member through which said sheet may be removed from the machine, (e) and a member operable for alternately opening and closing said first and said second slot.

7. In a recording machine wherein a flexible record sheet having two opposite recording faces is moved past a single magnetic head adapted to be advanced parallel to the leading edge of said sheet to scan successive tracks of each face, said faces being alternately exposed to said head, the combination of:

(a) a structure for guiding said sheet along a substantially 8-shaped path, said structure being formed of a pair of cylindrical guiding members wherein said sheet will travel in one sense and a guiding element located between said member wherein said sheet will travel in either sense, said members being symmetrical with respect to an intermediate plane crossing said element, the length of said sheet being at least half the length of said path, (b) means for mounting said head in the crossing line of said plane and said element, whereby said sheet will alternately expose either face to said head and the scanning of one track of one face is followed without discontinuity by the scanning of a corresponding track of the other face, (c) normally ineffective means for advancing said head step by step from one track to another of said sheet, (d) and means engageable by said leading edge on a single point of said path for rendering said advancing means effective.

No references cited.